United States Patent [19]

Capek

[11] Patent Number: 6,026,369

[45] Date of Patent: Feb. 15, 2000

[54] METHOD FOR DISTRIBUTING ADVERTISING IN A DISTRIBUTED WEB MODIFICATION SYSTEM

[75] Inventor: Peter George Capek, Ossining, N.Y.

[73] Assignee: International Business Machines Corporation, Armonk, N.Y.

[21] Appl. No.: 08/854,225

[22] Filed: May 9, 1997

[51] Int. Cl.[7] ...................................................... H01J 13/00
[52] U.S. Cl. .................................. 705/14; 705/1; 380/4; 380/25; 380/9
[58] Field of Search .................................... 705/14, 26, 1

[56] References Cited

U.S. PATENT DOCUMENTS

| | | | |
|---|---|---|---|
| 5,347,632 | 9/1994 | Filepp et al. | 395/200 |
| 5,406,626 | 4/1995 | Ryan | 380/9 |
| 5,506,902 | 4/1996 | Kubota | 380/9 |
| 5,515,270 | 5/1996 | Weinblatt | 364/405 |
| 5,629,980 | 5/1997 | Stefik et al. | 380/4 |
| 5,636,346 | 6/1997 | Saxe | 395/201 |
| 5,638,446 | 6/1997 | Rubin | 380/25 |
| 5,717,923 | 2/1998 | Dedrick | 395/613 |
| 5,724,521 | 3/1998 | Dedrick | 395/226 |
| 5,737,413 | 4/1998 | Akiyama et al. | 380/4 |
| 5,809,145 | 9/1998 | Slik et al. | 380/25 |
| 5,864,620 | 1/1999 | Pettitt | 380/4 |

OTHER PUBLICATIONS

Edge: Work–Group Computing Report; Internet Access: Internet Marketing Revolution Begins in the U.S. this Sep.; Hyper System promises new cash flow for providers. EDGE: Work–Group Computing Report, v7, n316, p2(1), Jun. 3, 1996.

*Primary Examiner*—Allen R. MacDonald
*Assistant Examiner*—Jagdish Patel
*Attorney, Agent, or Firm*—Anne VAchon Dougherty; Douglas W. Cameron

[57] ABSTRACT

A method of distributing program material to a number of access providers which have identified themselves as having clients meeting profiles specified in a program material placement request, which is typically from an advertiser. More specifically, summary information is transmitted to a control distribution node from each of the access providers, where the summary information describes customer profile information on the customers using each respective access provider. This summary information is then processed by the control distribution node to allocate the number of copies of program material that may be delivered to the clients or customers by each of the access provider nodes.

7 Claims, 3 Drawing Sheets

FIG. 3

Box 30 (left):

| Field | Value |
|---|---|
| Advertiser | PUCCI-MINULLI AUTOMOBILE Co. |
| Start Data | 12/1/1996 |
| End Data | 2/1/1997 |
| Total Number of Insertions Desired | 10000 |
| Geographic Placement | NY, NJ, CT |
| Demographic Target | ESTIMATED INCOME > $50000 |
| Interest Target | SPORTS CARS, CAR RACING |
| Web Use History Target | LESS THAN 10 HOURS PER MONTH |
| Presentation Time Target | 6PM TO 11PM LOCAL TIME |
| Click-Through URL | http://www.pucci.com/group-a.html |
| Image URL | http://www.pucci.com/group-a.gif |
| Placement Format | ☒ MODIFICATION  ☐ INTERSTITIAL |

Box 31 (middle):

| Field | Value |
|---|---|
| Query Identification | PM001 |
| Geographic Placement | NY, NJ, CT |
| Demographic Target | ESTIMATED INCOME > $50000 |
| Interest Target | SPORTS CARS, CAR RACING |
| Web Use History Target | LESS THAN 10 HOURS PER MONTH |
| Presentation Time Target | 6PM TO 11PM LOCAL TIME |

Box 32:

FROM AD-1: PM001 | 200
FROM AD-2: PM001 | 0
FROM AD-4: PM001 | 800

Box 35 (right):

| Field | Value |
|---|---|
| Advertiser | PUCCI-MINULLI AUTOMOBILE Co. |
| Start Data | 12/1/1996 |
| End Data | 2/1/1997 |
| Total Number of Insertions Desired | 3000 |
| Geographic Placement | NY, NJ, CT |
| Demographic Target | ESTIMATED INCOME > $50000 |
| Interest Target | SPORTS CARS, CAR RACING |
| Web Use History Target | LESS THAN 10 HOURS PER MONTH |
| Presentation Time Target | 6PM TO 11PM LOCAL TIME |
| Click-Through URL | http://www.pucci.com/group-a.html |
| Image URL | http://www.pucci.com/group-a.gif |
| Placement Format | ☒ MODIFICATION  ☐ INTERSTITIAL |

METHOD FOR DISTRIBUTING ADVERTISING IN A DISTRIBUTED WEB MODIFICATION SYSTEM

TECHNICAL FIELD

This invention relates to a method of distributing program material, possibly representing advertising placements, to network access providers whose clients satisfy profile criteria.

DESCRIPTION OF THE PRIOR ART

Recent improvements in communications networking and computer systems have made possible new paradigms for building interactive networks. The most well known such new network is the World Wide Web, built on the Internet. However, other networks are contemplated, although not practical today. Chief among these will likely be digital television networks, which may provide some form of on-demand service. In addition, related applications of the Internet, such as are enabled by RealAudio, effectively form new broadcast networks.

With such networks comes a desire and a need to support them financially, and the most common and most accepted way of doing this is by the inclusion of advertising in a form appropriate to the medium. The technology of these new networks provides new opportunities for such advertising, including particularly strong potential for customizing or targeting of advertising to individual viewers. This, of course, is highly desirable to advertisers and the flexibility inherent in these kinds of networks makes it very appropriate to incorporate such targeting.

We refer to the central site as the "control distribution node", and note that the distribution or insertion points are typically access providers, either for the Internet or for systems in other media. There are systems today for distributing advertisements from a small number of "central sites" to a large number of distribution or insert points. However, because existing media provide targeting primarily to demographically targeted audiences whose composition changes only very slowly, the current distribution systems are not designed for cases in which the targeted audience demographics or interest profile changes rapidly.

The World Wide Web is already being used for a certain degree of targeted advertising. However, in these cases, the advertisements are all "served" or delivered from a single location, so the distribution issue, in this sense, is not present. There is of course the aspect of actual delivery of such targeted advertisements from among a large pool of available ones, and there are several commercial products which perform this function. Among these are AdServer from NetGravity and AdManager from Accipiter. These programs, generically called "ad rotation" software, execute on a Web server and simply serve appropriate images or ads in response to Web requests, usually identifying the user based on a "cookie."

The current problem in the state of the art is that of accepting requests for the placement of advertising which is very highly targeted—based on demographic, psychographic, or other characteristics, or any combination of these. The points to which these requests are distributed (access provider nodes) for actual placement or insertion are diverse. Also, the number of placement requests is potentially so large that it is not feasible simply to distribute all of the ads to all of the insertion points. Doing so would further burden each of those nodes with dealing with a large number of such ad placement requests, which is not an efficient process.

SUMMARY OF THE INVENTION

It is an object of this invention to locate by access provider those clients which fit a model profile defined in a placement request from an advertiser.

It is another object of this invention to distribute to access provider nodes (insertion points) program material placement requests for execution by the latter nodes.

It is another object of this invention to determine the number of clients at an access point which fit a model profile defined in a placement request.

It is another object of this invention to allocate the number of advertisings or insertions among a number of access providers.

Accordingly with this invention, summary information is transmitted to a control distribution node from a number of access provider nodes. The cumulative summary information is used by this control distribution node to both: (a) determine which access provider nodes have customers with a target profile specified in a placement request from, for example, an advertiser; and (b) to allocate to some or all of the access providers a desired subset of placements (placement requests).

This invention is a solution for distributing advertisements (or other insertions or modifications to the basic distributed program material) from a small number of "central sites" to a large number of distribution or insert points.

Once the allocation process is completed and the allocated placement requests are sent to the access providers, no further interaction between the access providers and the control distribution node or among the access providers themselves is necessary to deliver the desired number of placements to the clients of the access providers.

With this invention, it is presumed that these insertion points have access to a data base describing the customers of that insertion point from a targeting point of view. The present invention uses that information in summary form to determine which access points are potentially appropriate to carry (deliver) a particular ad, and then passes a detailed query to each insertion point to determine more precisely the make up of the potential audience. Based on the results of these processes, it then allocates to a collection of insert points each placement request, and appropriately adjusts the intended delivery quantity, thereby effectively allocating a placement request to a number of insertion point for execution.

BRIEF DESCRIPTION OF THE DRAWINGS

FIG. 1 shows the sequence in time of the messages and responses transmitted between the control distribution nodes and the access provider nodes.

FIG. 3 illustrates the original placement request, the placement query and the responses thereto, and the allocated placement request.

This application is being filed concurrently with another application entitled: METHOD FOR PROVIDING INDIVIDUALLY CUSTOMIZED CONTENT IN A NETWORK, IBM Docket Number YO997-123. The latter application is hereby incorporated herein by reference.

DESCRIPTION OF THE PREFERRED EMBODIMENT

Figure 1:
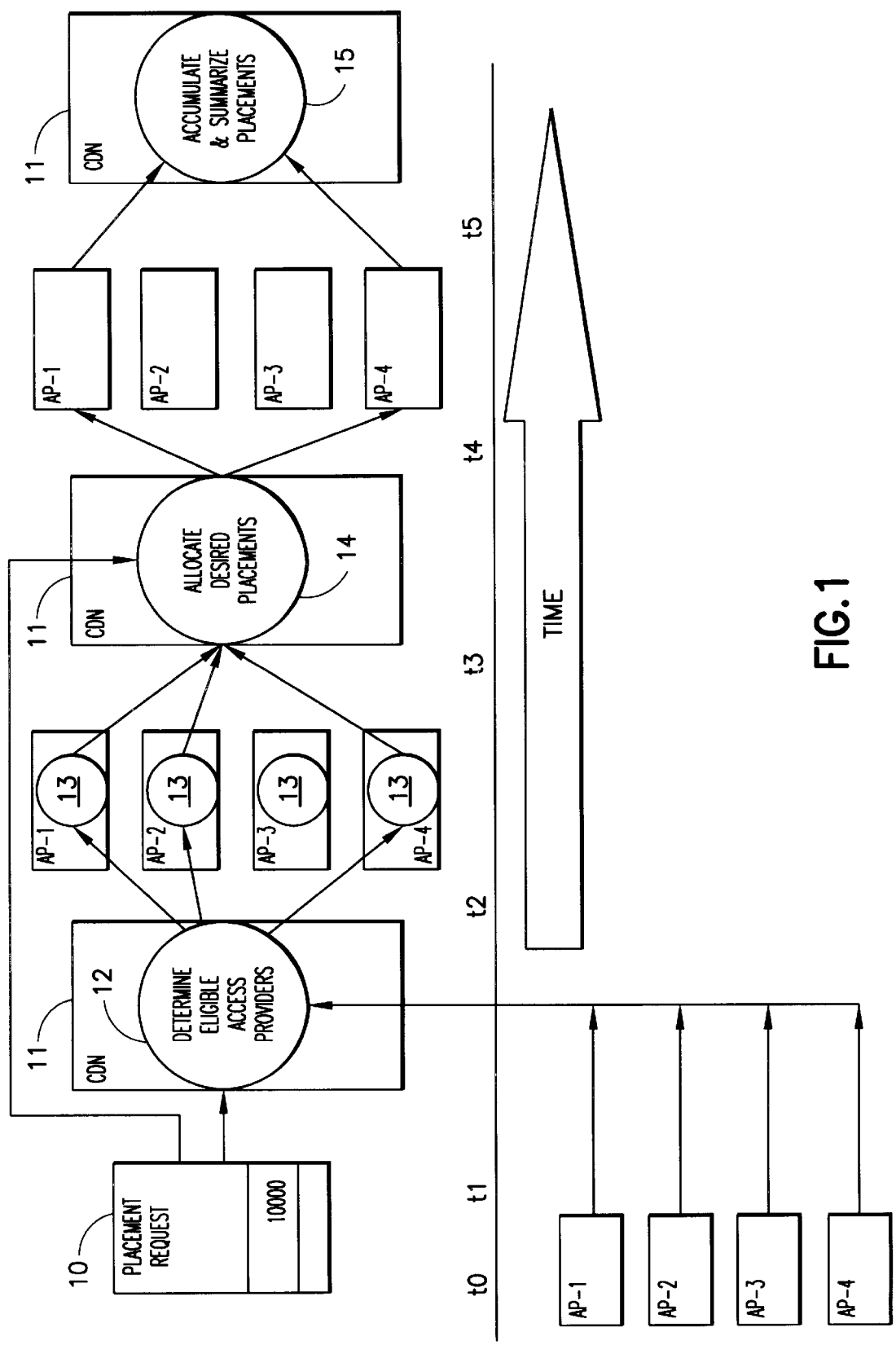
FIG. 1 graphically illustrates the overall sequence of events in accordance with the invention. More specifically.

Shown in FIG. 1 is the overall method of distributing program material in accordance with this invention. Starting at time $T_0$ and at periodic intervals thereafter, access provider nodes AP-1 through AP-4 transmit summary information to the control distribution node (CDN) 11, which stores and maintains this summary information. The summary information may, for example, include information describing the geographic distribution of, the estimated income, and other attributes of the access providers' customers. Examples of summary information are described in greater detail below. At $T_1$, the arrival of a placement request 30 from an advertiser initiates a process 12, whose goal is to determine which access providers are candidates to fulfill the placement request. Process 12 uses the specification in the placement request and the previously provided summary information to exclude certain access providers as candidates for fulfilling the placement request. The stored summary information is matched against the specifications in the placement request. For example, a specification in the placement request may call for a specific geographic area. If the stored summary information at the control distribution node indicates that a particular access provider node has little or no customers in the specified geographic area, then the latter access provider nodes will be excluded as candidates for fulfilling the placement request. Now suppose that process 12 determines that the customers of access provider 3 do not satisfy the placement request. Then, as shown at $T_2$, a placement query (See 31 of FIG. 3.) is sent to access providers 1, 2, and 4, in order to determine how many customers or clients of the candidate access providers fill the original placement request 10. Again referring to FIG. 3, notice that the placement query 31 is a subset of the placement request 30. In response to the latter placement query, similar to the process 12, each access provider determines how many of its customers meet the specifications in the placement request. More specifically, for example, the access providers will respond with a number (See 32 of FIG. 3.) which indicates how many of its clients satisfy the placement request. For example, access provider 1, 2, and 4, may respond with the numbers 200, 800 and 0, respectively.

In a range of time about time $T_3$, these responses are sent to the CDN, which processes them at 14 to allocate to the candidate access providers a portion or subset of a desired target number of placements specified in the placement request. One could, for example, allocate the number of placements using a pro rata method. For example, if the target number is 10,000 then access provider 1 would send 2,000 placements to its clients, access provider 4 would send 8,000, and access provider 2 would send 0 or no placements. At time $T_4$ the CDN sends the allocated placement request to each access provider chosen to participate in the execution of the placement request. In response to the placement request, each access provider, in this example, may execute the placement request by delivering to its customers the program material described in the placement request. The latter program material may also be used to customize other program material as described in a related application filed by the same assignee as that of the instant application. Also notice that the placement request 35 is identical to the placement request 30 except for the change in allocation of the number of insertions, which was changed as a result of the queries and responses received from the access providers and the implementation of processes 12 and 14. While the information in FIG. 3 is illustrated in the form of text and tables, this information may be actually transmitted in encoded form in accordance with standard techniques.

As illustrated at $T_5$ access providers 1 and 4 transmit to the CDN counts of the number of placements that they respectively delivered to their clients. The count information may be sent periodically or at a specified time in the future such as immediatly following the end date of Feb. 1, 1997 shown in the placement request. The CDN will then summarize the count information. Each access provider delivering placements to its customers will cease delivery when their count reaches its allocation.

If the summary information is sufficiently detailed for a specific placement request, then no placement query ($T_2$) and no response to this query ($T_3$) is necessary. That is, the placement request 10 and the summary information would be used to allocate to each access provider the number of placements that it is to send to its clients.

For example, in the placement request, the advertiser specifies the start date of Dec. 1, 1996 and the ending date of Feb. 1, 1997 as shown. Also shown in the request is the number of insertions (10,000), which is actually the total number of times that the ad is to be shown. The request may also include geographic specification such as New York, New Jersey, and Connecticut. Also included may be the demographic target such as families with an average income of more than $50,000. The request may show an interest target such as subscribers having an interest in sports cars. The above request can have many variations and is only shown as an example. Also shown in the placement request are such attributes as the intensity of web usage of target customers, and the best time to deliver the advertisements to the target customers. Finally the click through URL and the image URLs may also be included in the placement request, where the click through URL is the URL that a client would use if the client desires further information on the received advertisement. The image URL is the URL address of the advertisement that is delivered to the client. The placement request also includes an option to either modify base program material, or to present the program material as interstitial content. Interstitial content is material which is presented to the user between requested pages. This technique is well known to those skilled in the art.

Figure 2:
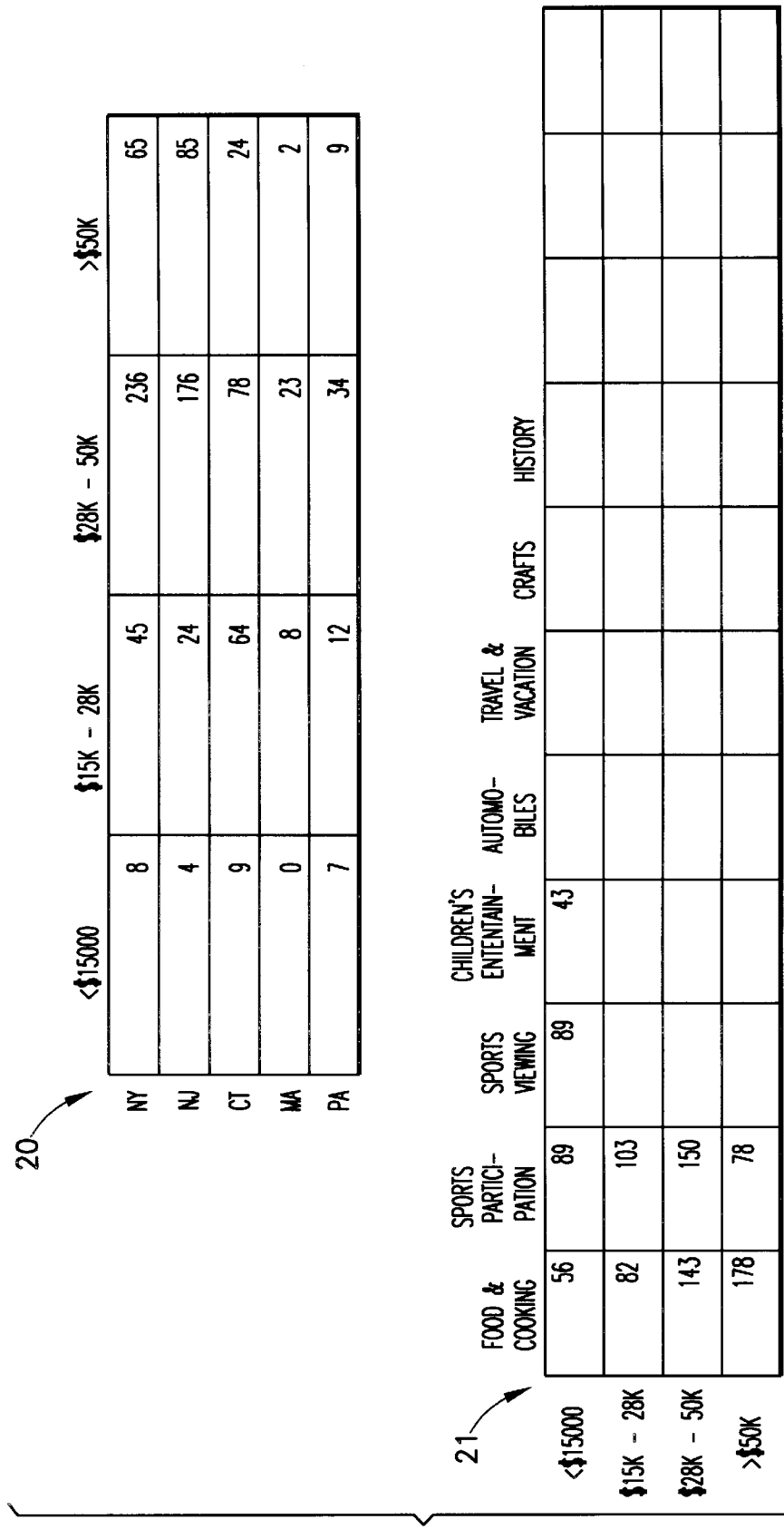
FIG. 2 shows two examples of summary data which is transmitted from the access provider nodes to the control distribution nodes.

FIG. 2 shows two examples of summary information that is typically transmitted from the access provider nodes to the control distribution nodes. As stated above, this summary information is used to describe the customers of each access provider node. For example, each row of table 20 describes the customers who reside in a particular state by income. Each column of the table corresponds to an estimated family income range. The intersection of a row and a column would then show data on the number of customers in a specific geographic area having a family income within a specified range.

Another example of summary information is illustrated in the table 21 of FIG. 2. Each row of the table represents customers within a particular income range, while the columns each represent a variety of attributes or interests. The number at the intersection of a row and column indicates the number of customers of an access provider with an estimated income in the indicated range who are believed or known to have the particular attribute or interest.

While in the above description, it was assumed that the access provider was a single node, in practice the access provider could be a number of nodes with a common set of customers.

Having thus described our invention, what we claim as new and desire to secure by Letters Patent is:

1. In a communications network having at least one control distribution node and a plurality of access provider nodes, each access provider node providing program material to a plurality of clients, a method of distributing program material placement requests to said access provider nodes over said network, said method comprising:

a. transmitting summary information describing customers of each of said access providers to said control distribution node;

b. processing a program material placement request using said summary information to determine which of said access providers are eligible to receive said program material;

c. transmitting a placement request query to said eligible access providers;

d. processing by each of said eligible access providers to determine a corresponding number of said clients which satisfy said placement request query and are served by each said eligible access provider;

e. transmitting each number determined in step d to said control distribution node;

f. processing each said number received in step e to allocate to each access provider a corresponding subset of a total number of copies of said program material placement request which each of said eligible access providers is to transmit to said clients; and g. distributing a corresponding modified version of said program material placement requests corresponding to said placement query to each of said access providers, each modified version of said program material placement request specifying said corresponding subset for each said access provider.

2. A method as recited in claim 1, further comprising the step of:

receiving from each of said access providers the number of times said program material was delivered to clients of each said access provider.

3. A method as recited in claim 1, wherein each of said access providers uses said program material to modify a number of distinct base program materials and wherein said control distribution node receives from each of said access providers the number of times said modified base program materials was delivered to clients of each said access provider.

4. In a communications network having at least one control distribution node and a plurality of access provider nodes, each access provider node providing program material to a plurality of clients, a method of distributing said program material to said access provider nodes over said network, said method comprising:

a. transmitting summary information describing customers of each of said access providers to said control distribution node;

b. processing a program material placement request using said summary information to determine which of said access providers are eligible to receive said program material;

c. processing said summary information received in step a to allocate to each eligible access provider a corresponding subset of a total number of copies of said program material which each of said eligible access providers are to transmit to said clients; and d. distributing a corresponding modified version of said program material placement request to each of said access providers, each modified version of said program material placement request specifying said corresponding subset for each said access provider.

5. A method as recited in claim 4, further comprising the step of:

receiving from each of said access providers the number of times said program material was delivered to clients of said each access provider.

6. A method as recited in claim 4, wherein each of said access providers executes said program material placement requests and wherein said control distribution node receives from each of said access providers the number of times said program material placement request was executed.

7. In a communications network having at least one control distribution node and a plurality of access provider nodes, each access provider node providing program material to a plurality of clients, a method of determining the number of clients which satisfy specifications in a placement request, said method comprising:

a. transmitting summary information to said control distribution node, said summary information describing those of said clients which are customers of each of said access providers;

b. processing a program material placement request using said summary information to determine which of said access providers are eligible to receive said program material;

c. transmitting a placement request query to said eligible access providers;

d. processing by each of said eligible access providers to determine the number of said clients which satisfy said placement request query; and e. transmitting each number determined in step d to said control distribution node, wherein said control distribution node then determines the total number of clients which meet specifications provided in said placement request.

* * * * *